United States Patent [19]

Drennan

[11] Patent Number: 5,363,262
[45] Date of Patent: Nov. 8, 1994

[54] DISK DRIVE HAVING AN IMPROVED TRANSDUCER SUSPENSION ASSEMBLY

[75] Inventor: George A. Drennan, Eagle, Id.

[73] Assignee: Hewlett-Packard Company, Palo Alto, Calif.

[21] Appl. No.: 865,006

[22] Filed: Apr. 8, 1992

[51] Int. Cl.$^5$ .......................... G11B 5/55; G11B 21/08
[52] U.S. Cl. ...................................... 360/106; 360/104
[58] Field of Search ................................ 360/104, 106

[56] References Cited

U.S. PATENT DOCUMENTS

| | | | |
|---|---|---|---|
| 4,544,972 | 10/1985 | Kogure et al. | 360/105 |
| 4,754,353 | 6/1988 | Levy | 360/106 |
| 4,807,054 | 2/1989 | Sorensen et al. | 360/104 |
| 4,829,395 | 5/1989 | Coon et al. | 360/106 |
| 4,870,525 | 9/1989 | Wong et al. | 360/137 |
| 4,912,583 | 3/1990 | Hinlein | 360/104 |
| 4,985,652 | 1/1991 | Dudet et al. | 360/106 |
| 4,991,045 | 2/1991 | Oberg | 360/104 |
| 5,027,242 | 6/1991 | Nishida et al. | 360/106 |
| 5,109,310 | 4/1992 | Ohkjita et al. | 360/106 |
| 5,189,577 | 2/1993 | Nishida et al. | 360/106 |
| 5,283,704 | 2/1994 | Reidenbach | 360/104 |

FOREIGN PATENT DOCUMENTS

| | | |
|---|---|---|
| 0428289 | 5/1991 | European Pat. Off. . |
| 0438806 | 7/1991 | European Pat. Off. . |
| 0494033 | 7/1992 | European Pat. Off. . |
| 3940909 | 6/1990 | Germany . |
| 3-127388 | 5/1991 | Japan . |
| 92109076 | 5/1992 | United Kingdom . |
| WO92/22056 | 12/1992 | WIPO . |

OTHER PUBLICATIONS

IBM Technical Disclosure Bulletin vol. 35, No. 7, Dec. 1992, pp. 39–40 'Divided actuator arm for high-density hard dik drives' * the whole document *.

Primary Examiner—Robert S. Tupper
Attorney, Agent, or Firm—E. F. Oberheim

[57] ABSTRACT

A hard disk drive having an actuator assembly in which only flexible integral load beams are used in the armstack structure. The load beams are assembled in a stack on a tubular actuator member along with the movable coil member of the actuator motor, or other actuator drive mechanism, and after alignment are secured to the tubular member to from a separate actuator assembly. This actuator assembly is applicable to both rotary and linear actuators in disk drives. In the rotary actuator assembly structure, the tubular member or hub is secured to a bearing housing journaled in the base of the drive for rotation about the axis of the tubular member. In the linear actuator structure, the tubular member, is fastened to the moving part of the linear drive mechanism and linearly moves with that mechanism.

12 Claims, 3 Drawing Sheets

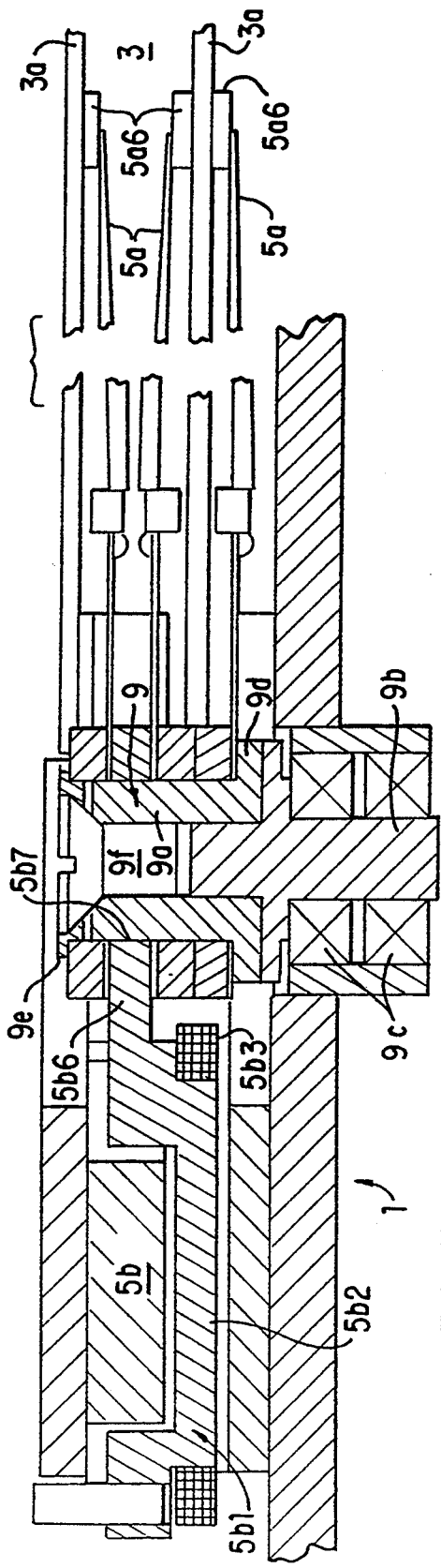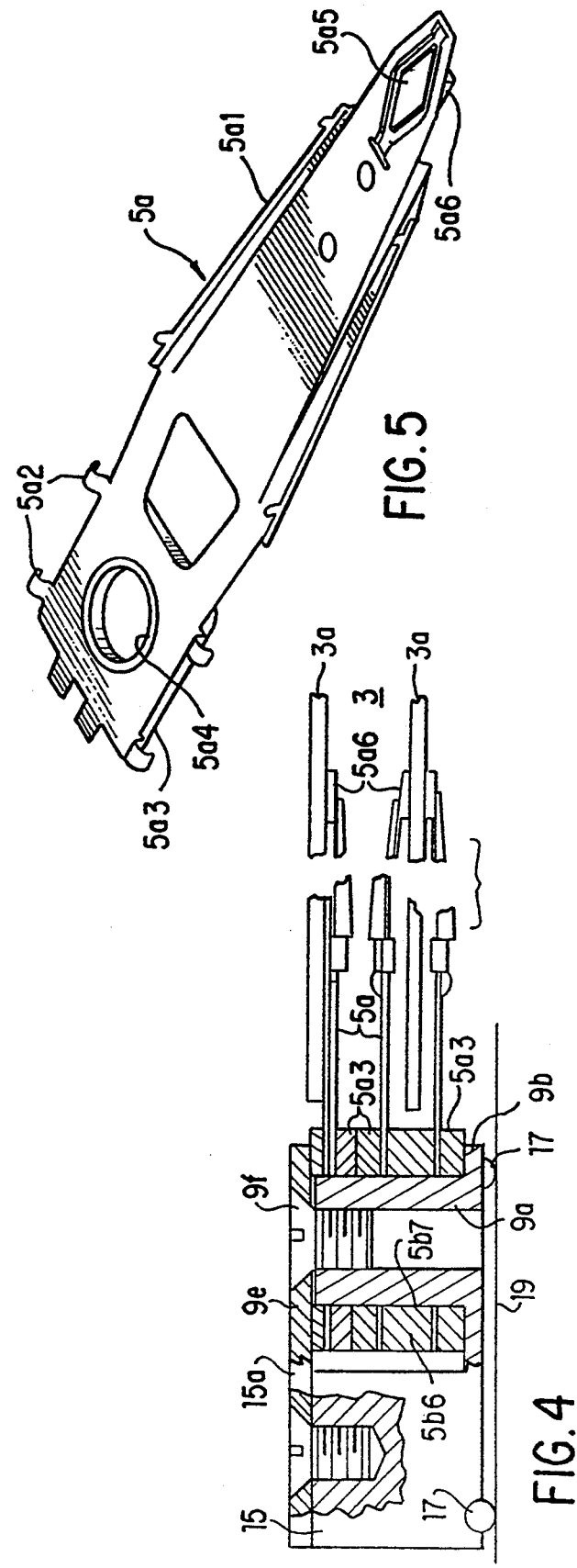

DISK DRIVE HAVING AN IMPROVED TRANSDUCER SUSPENSION ASSEMBLY

RELATED APPLICATION

Application of Mark D. Mastache and Peter A. Capano, Ser. No. 07/865,013, entitled Disk Drive Having An Improved Transducer Suspension Assembly, filed on the same date as this application and assigned to the same assignee.

FIELD OF THE INVENTION

This invention relates generally to disk drives and more particularly to the mechanical aspects of such drives as related to the transducer or head suspension assemblies.

BACKGROUND OF THE INVENTION

U.S. Pat. No. 4,829,395, to Coon et al, describes disk drives having transducer or head suspension assemblies in which individual load beams, carrying transducers at their distal ends, are attached at their mounting ends to individual arms of an armstack assembly by means of screws or ball swaged fittings. The thrust of the teachings of the patent to Coon et al is the provision of a transducer suspension assembly which permits the reduction in the axial spacing of the disks in order, by this expedient alone, to increase the volumetric density of recorded data by increasing the number of disks that can be packed in a given volume.

Trends toward smaller disk drives, particularly for applications where portability is a consideration, require drives of smaller form factor, of high data capacity, which are sufficiently rugged to withstand the mechanical shock associated with portability and which are light in weight. Down size scaling of drives, such as that of Coon et al, is not mechanically feasible. A new approach to the mechanical configuration of disk drives is needed to achieve a significantly reduced form factor drive providing improved performance in a mechanically abusive environment.

SUMMARY OF THE INVENTION

A significant reduction in the size of a disk drive is achieved, according to this invention, by attaching the load beam of the transducer or head suspension assembly directly to the moving part of the actuator drive motor, eliminating unnecessary armstack and/or actuator structure therebetween. By this expedient, reductions in both the size and the weight/inertia of the transducer actuator suspension assembly are achieved.

This invention is applicable in both linear and rotary actuator drives. The invention is disclosed in detail herein in a rotary actuator drive configuration which embodies the applicant's best mode for practicing this invention.

In prior art types of rotary actuator disk drives, the transducer actuator suspension assembly is pivotally mounted on a stationary support in the disk drive. Usually this support is the base and is so termed herein. The actuator assembly, as it moves angularly about the pivot axis, moves the transducers, individually connected to the respective arms of the armstack, to different radial locations with respect to the surfaces of the disks.

In the implementation of the best mode for practicing this invention, the conventional arm structure of the rotary actuator, as seen in Coon et al, is eliminated. Instead a spindle comprising a tubular member, functioning as the hub in the rotary actuator assembly, is rotatably mounted on the base to rotate about its central axis. This tubular member has a flange adjacent to one end. Load beams of flexible sheet steel, such as stainless steel sheet, are each provided with a reinforcing plate adjacent to one end, the mounting end. An opening or hole is formed through the reinforcing plate and the load beam, sized to provide a slip or sliding fit over the tubular member. A transducer is attached to the other end, the distal end, of each load beam. A motor, preferably a voice coil motor, has a stationary part fixed to the base of the drive and a moving part, the voice coil and its housing, is attached to the tubular member. In this attachment, the coil support or housing is provided with an opening or hole therethrough, in a location removed from the coil, which is sized to provide a slip or sliding fit over the tubular member. The load beams and the voice coil housing are stacked on the tubular member in a predetermined sequence, the stack seating upon the flange, and are thereafter aligned and secured to the tubular member by any suitable means. Such means including, by way of example but without limitation, currently practiced clamping, press fitting, or bonding techniques.

BRIEF DESCRIPTION OF THE DRAWINGS

The invention will be better understood by reference to the following specification when considered in conjunction with the accompanying drawings, in which:

FIG. 3 is an enlarged sectional view of the rotary actuator taken on the line III—III of FIG. 1.

FIG. 4 is side view, fragmentarily in section, illustrating the application of the transducer actuator assembly of this invention in a linear actuator disk drive, and FIG. 5 is a perspective view of a load beam of the type employed in this invention.

DETAILED DESCRIPTION OF THE INVENTION

Figure 1:
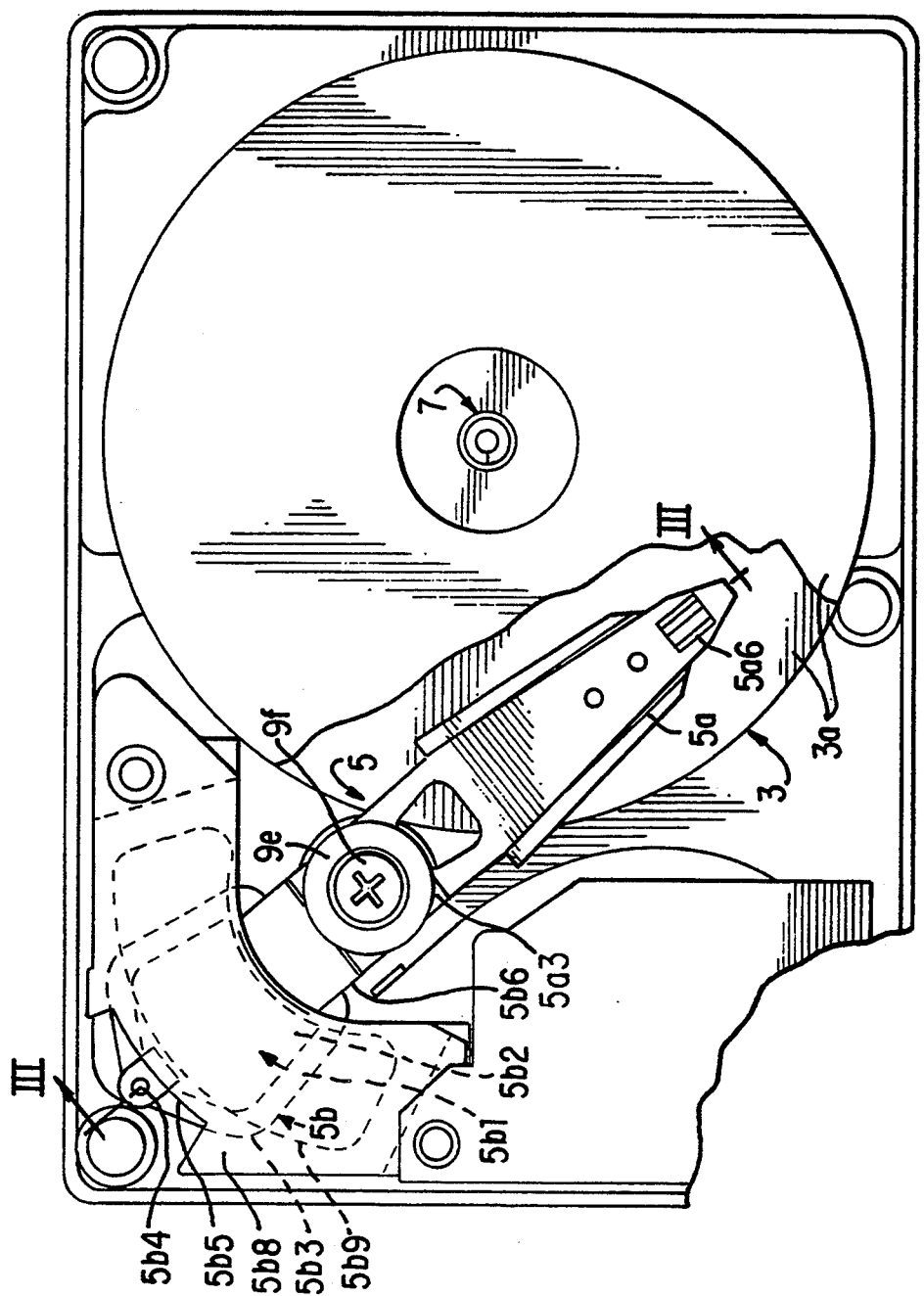
FIG. 1 is a plan view of a rotary actuator disk drive embodying the principles of this invention.
Figure 2:
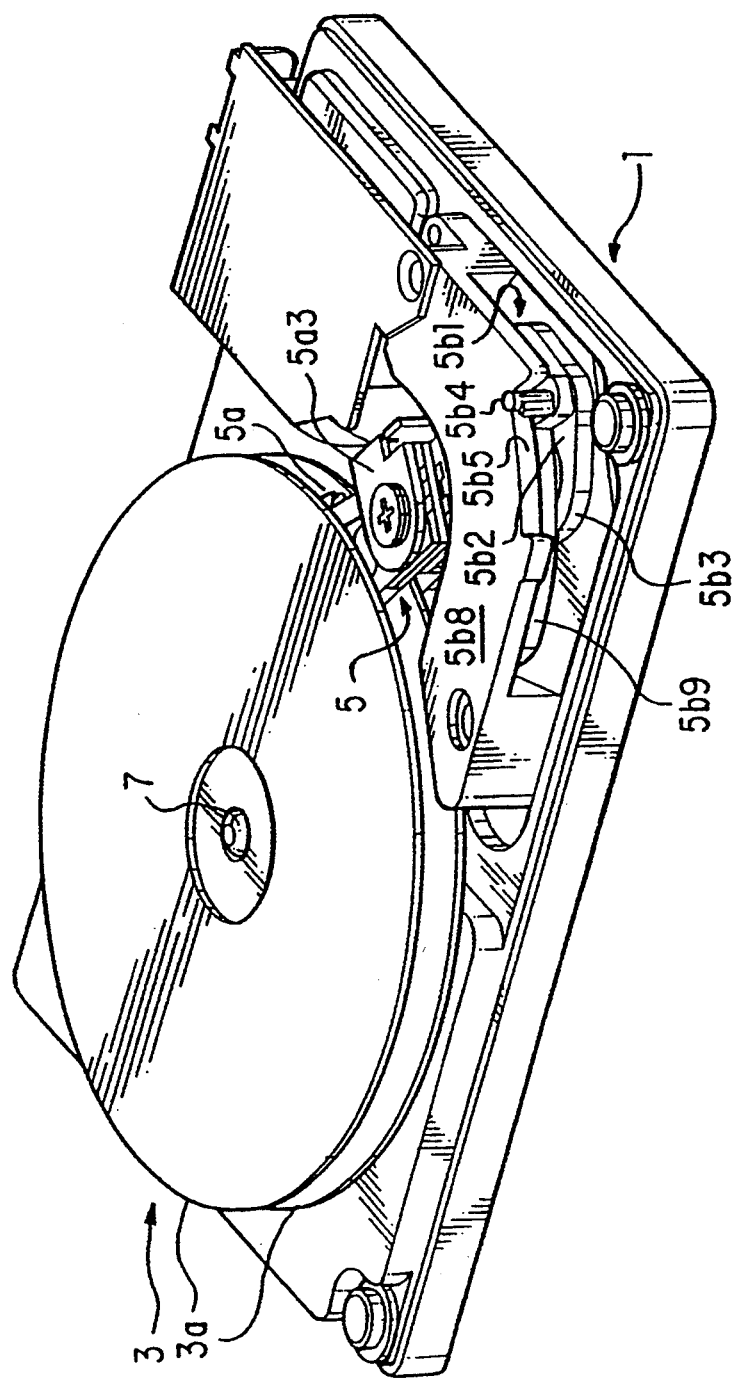
FIG. 2 is an isometric view of FIG. 1.

FIGS. 1, 2, 3 and 5 of the drawings illustrate a rotary actuator type of hard disk drive embodying the best mode for practicing this invention. The disk drive comprises a support or base 1 upon which a disk stack 3 and a rotary actuator assembly 5 are rotatably mounted and sealed within a housing, not shown. During operation, the disk stack 3 is rotated at a predetermined constant speed by an electric motor (not shown) about the axis of a spindle 7 secured to the base 1. The rotary actuator assembly 5 is assembled on a tubular member or hub $9a$, FIG.3, which is a coaxial part of a two piece spindle 9 the other part $9b$ of which is journaled by a pair of coaxial bearings $9c$ secured in the base 1. The rotary actuator assembly comprises one or more load beams $5a$ and a voice coil motor drive $5b$ therefor. A moving part $5b1$ of the voice coil motor $5b$, has a coil support or housing $5b2$ for the voice coil $5b3$. An extension arm $5b6$ of the coil support or housing $5b2$ is stacked with the load beam or beams $5a$ in a predetermined sequence on the tubular hub $9a$ and secured thereto. Angular movement of the rotary actuator assembly 5 is limited by a crash stop structure comprising a pin $5b4$ anchored in the coil support $5b2$. The pin $5b4$ projects adjacent an arcuate edge or recess $5b5$ in the upper magnet plate $5b8$ of the voice coil motor $5b$, in which position the pin $5b4$ impacts the ends of the arcuate recess 5b5 to provide a mechanical limit to angular movement of the rotary actuator assembly 5. The upper magnet plate 5b8 supports a permanent magnet 5b9, forming part of the voice coil motor 5b.

The structural details of the rotary actuator assembly 5 are best seen in the enlarged sectional view of FIG.3. Here, for a specific disk drive, the disk stack 3 comprises two axially spaced disks, each designated 3a. The number of disks employed, within mechanical limits, is determined by the amount of data storage that is required for a particular application. The invention may be practiced using one or more disks.

The spindle 9 of the rotary actuator assembly 5 comprises an upper spindle section in the form of a cylindrical or tubular hub 9a, coaxially joined to a lower spindle section 9b. The lower spindle section 9b is journaled in a coaxial bearing pair 9c in the base 1.

The cylindrical or tubular member 9a has a peripheral flange 9d which may be continuous or which may comprise circumferentially spaced sectors. All of the parts of this rotary actuator assembly 5 are assembled as a stack seated on this flange 9d of the tubular hub 9a. These parts in this stack comprise a plurality of load beams 5a (see FIG.5) and the arm 5b6 of the coil support or housing 5b2, assembled in a particular sequence on the tubular hub 9a.

The load beams 5a are configured as illustrated in FIG.5. They are etched in plan form from thin stainless steel sheet. In one practical embodiment of this invention, the stainless steel sheet was of the order of 3 mils thick. Flanges 5a1 are mechanically formed to provide the required load beam stiffness and stability. Tabs 5a2 are partially bent. Bending of the tabs is completed at the time of installation of the transducer wires (not shown). The mounting end of the load beam comprises a reinforcing plate 5a3 which is welded to the bottom side, of the load beam 5a, as seen in FIG.5. An opening or hole 5a4 is formed through the reinforcing plate and the load beam. The diameter of this opening, according to the best mode, is sufficient to provide a slip or sliding fit over the tubular hub 9a. The distal end of the load beam has attached thereto a leaf spring 5a5 which functions as a gimbal mount for a transducer 5a6, such as a magnetic head, the slider of which is bonded thereto. The transducer 5a6 is mounted on the same side or face of the load beam 5a as the reinforcing plate 5a3, for this particular application.

The extension of the coil support or housing 5b2, such as the arm 5b6, is also provided with an opening or hole 5b7 therethrough of a diameter to provide a slip or sliding fit over the cylindrical portion of the cylindrical member 9a.

The thickness of the reinforcing plates 5a3 and of the arm 5b6 is determined by the axial spacing of the disks 3a in the disk stack 3. Thus, for the assembly shown in FIG.3, the reinforcing plates 5a3, when placed face to face at the bottom of the stack, axially space the load beams 5a a distance which, together with any predetermined bend in the load beams, places the transducers 5a6, FIG.2, in the required spring loaded contact with the opposite surfaces of a single disk, as seen with the two load beams at the bottom of the stack in FIG.3. Similarly, the thickness of the arm 5b6 spaces the load beams on each side thereof a distance to provide the required spring loading of the transducers 5a6 against the confronting faces of adjacent disks 3a in the disk stack 3. This integration of the load beams 5a and the coil support or housing 5b, to form a transducer actuator assembly 5, is secured by a clamp plate 9e seated upon the reinforcing plate 5a3 of the upper load beam 5a, as seen in FIG. 3. Clamping force is applied by a screw 9f which is axially threaded into the upper end of the tubular hub 9a. It will be understood, that prior to applying the clamping force to the load beams 5a and the coil support or housing 5b, these parts are necessarily aligned in desired positions and so retained, as by a jig, after which the axial clamping force is applied.

As an alternative to the method of securing the load beams 5a and the coil support or housing 5b described above, the openings or holes 5a4 in the load beam/reinforcing plate and the hole 5b7 in the arm 5b6 of the coil support or housing, may be made slightly undersize to provide an interference fit on the tubular member 9a. Assembly is accomplished by aligning and individually pressing the load beams 5a and the arm 5b5, in proper sequence, over the tubular member 9a.

As a further alternative, the load beams 5a and the arm 5b6 may be bonded by a suitable bonding agent, such as an epoxy, with the load beams 5a and the arm 5b5 retained in secured alignment during the curing interval of the bonding agent.

Other techniques for integrating the transducer actuator assembly will be apparent to those skilled in the art.

FIG.4 illustrates the application of this invention to a linear actuator disk drive. Also illustrated here is the second of two possible transducer actuator assemblies using a load beam in which the transducer is attached to the opposite face of the load beam from that seen in FIG.5. This load beam structure is seen in FIG.4. Thus, this application requires a different sequence of assembly of the load beams 5a and the arm 5b6 of the coil support or housing 5b on the cylindrical member 9a.

In FIG.4, the linear actuator is depicted only in functional concept to facilitate the illustration. To this end the linearly movable actuator mechanism 15 is mounted on wheels 17 which roll along a track 19. The actuator mechanism 15 is driven by any suitable motor means (not shown). The tubular member 9a may be an integral or integrated part of the actuator mechanism 15. It will be observed that the sequence of assembly of the load beams and the arm on the cylindrical member 9a is inverted or reversed from that seen in FIG.3. The two lower load beams 5a are spaced apart by the arm 5b6, which functions here simply as a spacer since the tubular member 9a is otherwise connected to the actuator mechanism 15. The respective transducers 5a6, being on a face of the respective load beams 5a opposite that of the reinforcing plate 5a3, confront opposite faces of the lowermost disk 3a in the disk stack. At the upper end of this actuator stack, the reinforcing plates 5a3 of the adjacent load beams 5a are disposed in face to face contact. This spaces the uppermost load beam so that its transducer, now facing upwardly, as viewed, is disposed against the bottom face of the upper disk of the disk stack. This transducer armstack assembly is secured, as in FIG.3, by a screw axially threaded into the cylindrical member 9a, which applies clamping force to the top plate 15a of the actuator 15. Alternative assembly an integrating techniques, as discussed above in connection with FIG.3, are applicable here.

While the invention has been described in a disk drive having two disks in a disk stack and three load beams, such disclosure while representing the presently known best mode for practicing the invention, is made by way of example only. The invention may be practiced with a single disk as readily seen from either of FIGS.3 or 4. It is equally evident that three or more disks may be employed. Since only one actuator drive mechanism is required, a spacer ring or plate of the same thickness as the arm 5b6 is substituted for the arm, as was done in the linear actuator example of FIG.4.

Although the transducer actuator assembly of this invention is described as a rotary actuator in disclosing the best mode for practicing this invention, this actuator assembly is equally applicable in a linear actuator drive, as demonstrated in FIG.4.

This transducer actuator structure eliminates unnecessary structure. The light weight load beam is scaled to the size of the disk and is particularly useful in small form factor drives, such as those of 3.5 inch form factor or less. This eliminates unnecessary structure, especially those cast arms of the type of Coon et al. This reduces both the actuator mass and the parts count. Reduction of the actuator mass reduces the actuator drive power requirements and/or reduces the time to access a target track, the seek time. Reduction of the parts count reduces the parts inventory, reducing the overhead cost burden. The elimination of parts from the drive eliminates that aspect of the cost and, with fewer parts, reduces the assembly cost, to reduce the total cost of the drive.

What is claimed is:

1. A disk drive comprising:
   a. a disk drive base;
   b. at least one disk rotatably mounted to said base, said disk having a recording surface;
   c. at least one flexible integral load beam having a mounting end with a reinforcing plate attached thereto and having a distal end, said mounting end and attached reinforcing plate having a mounting opening therethrough;
   d. a transducer attached to said distal end of said flexible integral load beam;
   e. a rotary actuator hub having a tubular body, said tubular body having an axial opening therein and having an external flange, said tubular body projecting through said mounting opening with said mounting end of said at least one flexible integral load beam seated upon said external flange which axially indexes said flexible integral load beam with respect to said tubular body of said rotary actuator hub;
   f. means for securing said mounting end of said at least one flexible integral load beam to said tubular body with said mounting end seated upon said external flange, forming an integrated rotary transducer actuator assembly;
   g. bearing assembly mounted to said base and having a rotatable part defining a bearing axis;
   h. means for securing said rotatable part of said rotary actuator bearing assembly in said axial opening in said tubular body as a coaxial part thereof for axially indexing and rotatably positioning said integrated transducer actuator assembly with respect to said disk so that said transducer overlaps said recording surface of said disk, and
   i. motor means having a stationary part mounted to said base and a moving part for rotating said integrated transducer actuator assembly about said bearing axis.

2. The disk drive according to claim 1, in which:
   a. said moving part of said motor means comprises an extension arm having a mounting opening therethrough receiving said tubular body and said extension arm being stacked with said mounting end of said flexible integral load beam in a stack seated on said external flange.

3. The disk drive according to claim 2, comprising:
   a. at least two axially spaced rotatably mounted disks, each disk having opposite recording surfaces;
   b. at least two flexible integral load beams, each flexible integral load beam having a mounting end with an attached reinforcing plate in said stack seated on said external flange on said tubular body;
   c. said extension arm being disposed between each said mounting end of said at least two flexible integral load beams in said stack seated on said external flange of said tubular body, and
   d. said at least two flexible integral load beams project between said disks with said transducers over respective recording surfaces of said at least two disks.

4. The disk drive according to claim 1, in which:
   a. said tubular body is a substantially cylindrical body in said mounting opening of said flexible integral load beam;
   b. said means for securing comprises, clamp means mounted to said substantially cylindrical body engaging said mounting end of said flexible integral load beam in a position opposite said external flange, and
   c. a screw engaging said clamp means and threadedly engaging said substantially cylindrical body, for biasing said clamp means against said mounting end of said flexible integral load beam and clamping said mounting end of said flexible integral load beam to said substantially cylindrical body between said external flange and said clamp means.

5. A disk drive comprising:
   a. a disk drive base;
   b. at least two axially spaced rotatably mounted disks, each disk having opposite surfaces;
   c. at least three flexible integral load beams, each flexible integral load beam having a mounting end and a distal end, each mounting end having an opening therethrough;
   d. a reinforcing plate on the corresponding faces of the mounting ends of each load beam, each reinforcing plate having an opening therein aligned with the opening thereat in said mounting end of each flexible integral load beam;
   e. a transducer mounted on the distal end of each flexible load beam;
   f. a motor having a permanent magnet stator on said base and a coil;
   g. a coil support mounting said coil;
   h. an arm projecting from said coil support, said arm having an opening therethrough in a position displaced from said coil;
   i. a rotary actuator hub having opposite ends and having an axial opening therein defining an axis;
   j. an external flange on said rotary actuator hub adjacent one end of said opposite ends of said rotary actuator hub,
   k. two of said flexible integral load beams being stacked on said rotary actuator hub in a stack of two flexible integral load beams with said reinforcing plates in face to face contact and with one flexible integral load beam seated upon said external flange;

l. said arm of said coil support being disposed on said rotary actuator hub in a position spacing the remaining flexible integral load beam of said at least three flexible load beams from said stack of two flexible integral load beams;

m. a clamp comprising a plate secured to the other end of said opposite ends of said rotary actuator hub, said plate having a peripheral rim engaging said remaining flexible integral load beam and compressing said remaining flexible integral load beam, said arm and said stack of two flexible integral load beams between said flange and said peripheral rim of said clamp on said rotary actuator hub, forming a separate integrated actuator assembly:

n. an elongated cylindrical member rotatably journaled to said base for rotation about an axis substantially perpendicular to said base, and o. means for securing said elongated cylindrical member within said axial opening in said rotary actuator hub of said separate integrated actuator assembly, said coil being positioned at said stator of said motor in flux linkage with said permanent magnet stator of said motor, the flexible integral load beams of said stack of two flexible integral load beams and the transducers thereof projecting, respectively to opposite surfaces of one of said at least two disks and said remaining flexible integral load beam and transducer thereof projecting to a surface of the remaining disk of said at least two disks, said axis of said elongated cylindrical member coinciding with the axis of said axial opening in said rotary actuator hub at the mounting ends of said at least three flexible integral load beams.

6. An integrated transducer actuator assembly for a disk drive, comprising:

a. a flexible integral load beam having a mounting end and a distal end;

b. a reinforcing plate attached to said mounting end of said flexible integral load beam;

c. said mounting end of said flexible integral load beam and attached reinforcing plate having a mounting opening therethrough;

d. a transducer attached to said distal end of said flexible integral load beam;

e. a motor coil f. a motor coil support member mounting said motor coil and having a mounting opening therethrough in a position displaced from said motor coil;

a tubular actuator hub having an axial opening therethrough, said tubular actuator hub having an external flange and being disposed in each said mounting opening with said mounting end of said flexible integral load beam and said motor coil support member positioned in a stack seated upon said external flange and projecting in substantially opposite directions from said tubular actuator hub;

h. a clamp secured to said tubular member at the end of said stack opposite said external flange and having a clamp portion engaging compressing said stack between said external flange and said clamp, forming an integrated transducer actuator assembly;

i. said axial opening in said tubular actuator hub for mounting said integrated transducer actuator assembly.

7. The integrated transducer actuator assembly according to claim 6, in which;

a. said tubular actuator hub comprises a cylindrical body disposed in each said mounting opening.

8. An integrated transducer actuator assembly for a disk drive, comprising:

a. at least two flexible integral load beams, each having a mounting end and a distal end, each mounting end having an opening therethrough;

b. a reinforcing plate attached to said mounting end of each flexible integrated load beam and having an opening therethrough aligned with the opening through said mounting end of said flexible integral load beam, defining a mounting opening;

c. a transducer attached to the distal end of each flexible integral load beam;

d. a movable motor part comprising an extension arm having a mounting opening therethrough;

e. a tubular actuator hub having a substantially cylindrical axial opening therethrough and having an external flange, said tubular actuator hub being disposed in each said mounting opening;

f. means for securing each said mounting end of said at least two integral load beams in a stack on said tubular rotary actuator hub, seated upon said external flange, with said extension arm in a position between each said mounting end of said at least two flexible integral load beams, forming an integrated transducer actuator assembly;

g. said substantially cylindrical axial opening in said tubular actuator hub for mounting said integrated transducer actuator assembly.

9. An integrated transducer actuator assembly for a disk drive, comprising:

a. a tubular actuator hub having a substantially cylindrical axial opening therein, said tubular actuator hub having an external flange;

b. an actuator motor coil support having an arm, said arm having a mounting opening therethrough;

c. at least one flexible integral load beam having a mounting end with a reinforcing plate attached thereto and having a distal end, said mounting end and attached reinforcing plate having a mounting opening therethrough;

d. a transducer attached to the distal end of said at least one flexible integral load beam;

e. said arm of said coil support and said mounting end of said at least one flexible integral load beam receiving said tubular actuator hub through said mounting opening in each and being positioned on said tubular actuator hub in a stack seated upon said flange, and f. means for securing said mounting end of said flexible integral load beam and said arm of said coil support in said stack seated said flange, to said tubular actuator hub, forming an integrated transducer actuator assembly;

g. said substantially cylindrical axial opening in said tubular actuator hub for mounting said integrated transducer actuator assembly.

10. A disk drive, comprising:

a. A disk drive base;

b. at least one memory disk rotatably mounted on said base, said memory disk having opposite surfaces;

c. at least one flexible integral load beam having a mounting end and a distal end, said mounting end having an opening therethrough;

d. a reinforcing plate on said mounting end, said reinforcing plate having an opening therethrough aligned with said opening in said mounting end;

e. a transducer mounted on said distal end;
f. a motor having a permanent magnet stator on said base and a coil;
g. a coil support mounting said coil;
h. an arm projecting from said coil support, said arm having an opening therethrough in a position displaced from said coil;
i. a rotary actuator hub having opposite ends and having an axial opening therein defining a rotation axis through said opposite ends;
j. an external flange on said rotary actuator hub adjacent one end of said opposite ends of said rotary actuator hub;
k. said rotary actuator hub being disposed through each said opening forming a stack of said flexible integral load beam and said arm on said rotary actuator hub, said stack having opposite ends, one end of said opposite ends of said stack being seated against said flange with said flexible integral load beam and said arm projecting in opposite directions from said rotary actuator hub;
l. a clamp comprising a plate secured to the other end of said opposite ends of said rotary actuator hub, said plate having a peripheral rim engaging the other end of said opposite ends of said stack and compressing said stack between said flange and said peripheral rim of said clamp on said rotary actuator hub, forming a separate integrated actuator assembly;
m. an elongated cylindrical member rotatably journaled to said base for rotation about an axis substantially perpendicular to said base, and
n. means for securing said elongated cylindrical member within said axial opening in said rotary actuator hub of said separate integrated actuator assembly, said coil being disposed in flux linkage with said permanent magnet stator of said motor and said transducer being located over one surface of said opposite surfaces of said memory disk, said axis of said elongated cylindrical member coinciding with said rotation axis of said axial opening of said rotary actuator hub at said mounting end of said flexible integral load beam.

11. The disk drive according to claim 10, comprising:
a. at least two axially spaced rotatably mounted disks, each disk having opposite surfaces;
b. at least two flexible integral load beams, each having a mounting end in said stack on said flange on said rotary actuator hub;
c. said arm of said coil support is disposed between said flexible integral load beams on said rotary actuator hub, and
d. said flexible integral load beams project between said disks with said transducers over respective surfaces of said at least two disks.

12. A disk drive, comprising:
a. a disk drive base;
b. at least two axially spaced rotatably mounted memory disks, each disk having opposite surface;
c. at least three flexible integral load beams, each flexible integral load beam having a mounting end with an opening therein and a distal end, each mounting end having opposite faces;
d. a reinforcing plate on the corresponding faces of said opposite faces of the mounting ends of each flexible integral load beam, each reinforcing plate having an opening therein aligned with the opening thereat in said mounting end of each flexible integral load beam;
e. a transducer mounted on said distal end of each flexible integral load beam,
f. a motor having a permanent magnet stator on said base, said motor also having a coil;
g. a coil support mounting said coil;
h. an arm projecting from said coil support, said arm having an opening therethrough in a position displaced from said coil;
i. a rotary actuator hub having opposite ends and having an axial opening therethrough defining a rotation axis through said opposite ends;
j. an external flange on said rotary actuator hub adjacent one end of said opposite ends of said rotary actuator hub;
k. two of said flexible integral load beams being placed on said hub in a stack of two flexible integral load beams seated upon said flange with said reinforcing plates in face to face contact;
l. said arm of said coil support being disposed on said rotary actuator hub in said stack between the remaining flexible integral load beam of said at least three flexible integral load beams and said stack of two flexible integral load beams, and said remaining flexible integral load beam and the transducer on the distal end thereof projecting to a surface of the remaining disk of said at least two discs, said axis of said elongated cylindrical member coinciding with the axis of said axial opening in said rotary actuator hub at the mounting ends of said at least three flexible integral load beams;
m. a clamp comprising a plate secured to the other end of said opposite ends of said rotary actuator hub, said clamp having a peripheral rim engaging said remaining flexible integral load bean of said stack and compressing said stack between said flange and said peripheral rim of said clamp on said rotary actuator hub, forming a separate integrated actuator assembly;
n. an elongated cylindrical member rotatably journaled to said base for rotation about an axis substantially perpendicular to said base, and
o. means for mounting said integrated actuator assembly to said elongated cylindrical member with said elongated cylindrical member secured in said axial opening of said rotary actuator hub, said coil being disposed in flux linkage with said permanent magnet stator of said motor, said transducers of said two of said flexible integral load beams projecting to opposite surfaces of one of said at least two memory disks, said remaining flexible integral load beam and the transducer on the distal end thereof projecting to a surface of the remaining memory disk of said at least two memory disks, and said axis of said elongated cylindrical member coinciding with the axis of said axial opening in said rotary actuator hub at the mounting ends of said at least three flexible integral load beams.

* * * * *